(12) United States Patent
Oney et al.

(10) Patent No.: US 6,581,334 B2
(45) Date of Patent: Jun. 24, 2003

(54) HIGH STRENGTH T-JOINT FOR INFLATABLE TUBE STRUCTURES

(75) Inventors: Ted H. Oney, Gilbert, AZ (US); Haiwen Meng, Tempe, AZ (US)

(73) Assignee: Goodrich Corporation, Charlotte, NC (US)

(*) Notice: Subject to any disclaimer, the term of this patent is extended or adjusted under 35 U.S.C. 154(b) by 0 days.

(21) Appl. No.: 10/003,689

(22) Filed: Nov. 2, 2001

(65) Prior Publication Data

US 2003/0085567 A1 May 8, 2003

(51) Int. Cl.$^7$ .............................................. B64D 25/14
(52) U.S. Cl. ..................... 52/2.18; 52/2.11; 285/133.5; 138/120; 182/48; 244/905
(58) Field of Search ................... 52/2.11, 2.18; 403/187, 188; 285/133.11, 133.5, 133.6, 919; 138/120, 98; 182/48; 244/905, 137.2; 277/602, 608

(56) References Cited

U.S. PATENT DOCUMENTS

| | | | | |
|---|---|---|---|---|
| 3,433,342 A | * | 3/1969 | Switlik | 193/25 B |
| 3,827,094 A | * | 8/1974 | Fisher | 441/38 |
| 3,845,920 A | * | 11/1974 | Satterfield et al. | 244/137.2 |
| 3,860,984 A | | 1/1975 | Fisher | |
| 3,995,339 A | | 12/1976 | Kaufman | |
| 4,018,321 A | * | 4/1977 | Fisher | 193/25 B |
| 4,127,909 A | | 12/1978 | Pizzo | |
| 4,434,870 A | * | 3/1984 | Fisher | 182/48 |
| 4,676,532 A | * | 6/1987 | Gronau et al. | 285/133.5 |
| 4,718,700 A | * | 1/1988 | Horch et al. | 285/133.5 |
| 5,340,160 A | * | 8/1994 | Meijers et al. | 285/15 |
| 5,875,868 A | * | 3/1999 | Smialowicz et al. | 182/48 |
| 6,103,052 A | * | 8/2000 | Kamiyama et al. | 156/253 |
| 6,158,473 A | * | 12/2000 | Kamiyama et al. | 138/98 |
| 6,454,220 B1 | * | 9/2002 | Oney | 182/48 |
| 6,482,280 B1 | * | 11/2002 | Kiest et al. | 156/87 |

FOREIGN PATENT DOCUMENTS

| | | | | |
|---|---|---|---|---|
| DE | 2 131 369 A | * | 6/1984 | B63C/9/22 |
| EP | 0 184 745 A2 | * | 6/1986 | B61B/12/00 |
| EP | 0615902 | | 9/1994 | |

* cited by examiner

Primary Examiner—Carl D. Friedman
Assistant Examiner—Brian E. Glessner
(74) Attorney, Agent, or Firm—Jerry Holden; John D. Titus

(57) ABSTRACT

A high strength T-joint for inflatable tubular is formed by forming a butt joint between the end of a first two tubular member and the side wall of a second tubular member. The opening in the side wall of the second tubular member is sized to match the end of the transverse support member so that a sealing flange can be applied to the inner surface of the joint to provide an airtight seal. A reinforcing flange comprising a disk-shaped piece of fabric having a center opening, is then bonded over the opening in the second tubular member. The center opening in the reinforcing flange is substantially smaller than the opening in the side rail member. Therefore the reinforcing flange substantially reduces the size of the discontinuity in the side wall of side rail member, thereby substantially increasing the circumferential ("hoop") load capacity of the side wall of the side rail member and substantially increasing the rupture pressure of the joint.

12 Claims, 3 Drawing Sheets

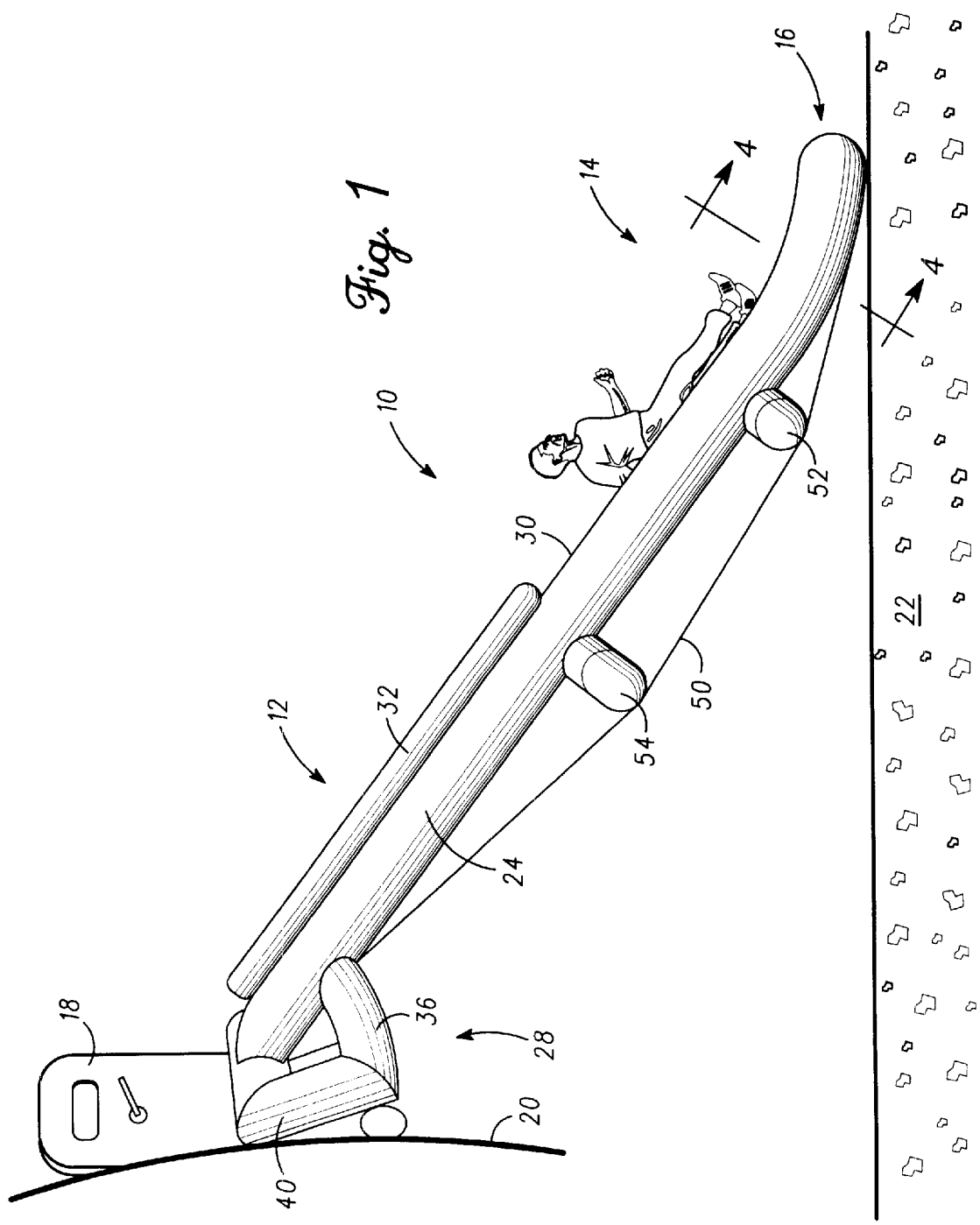

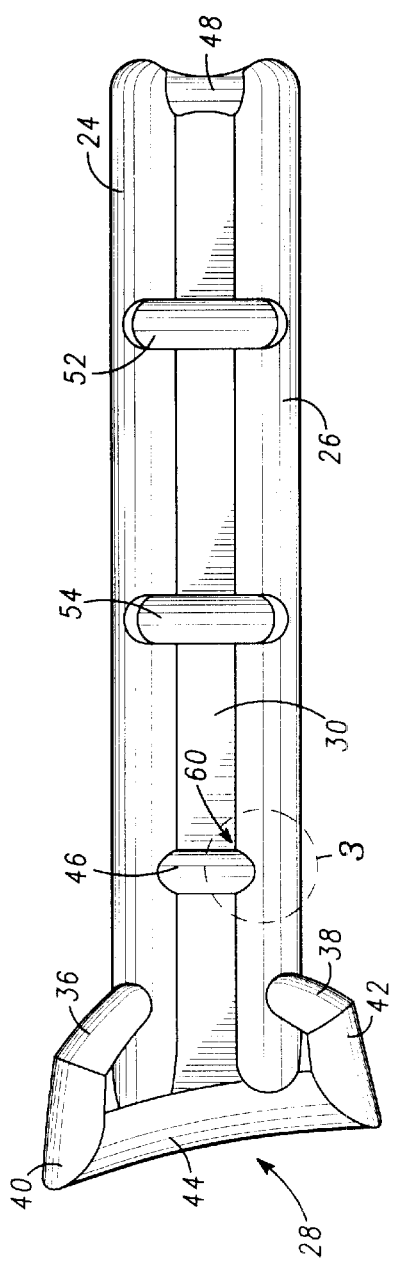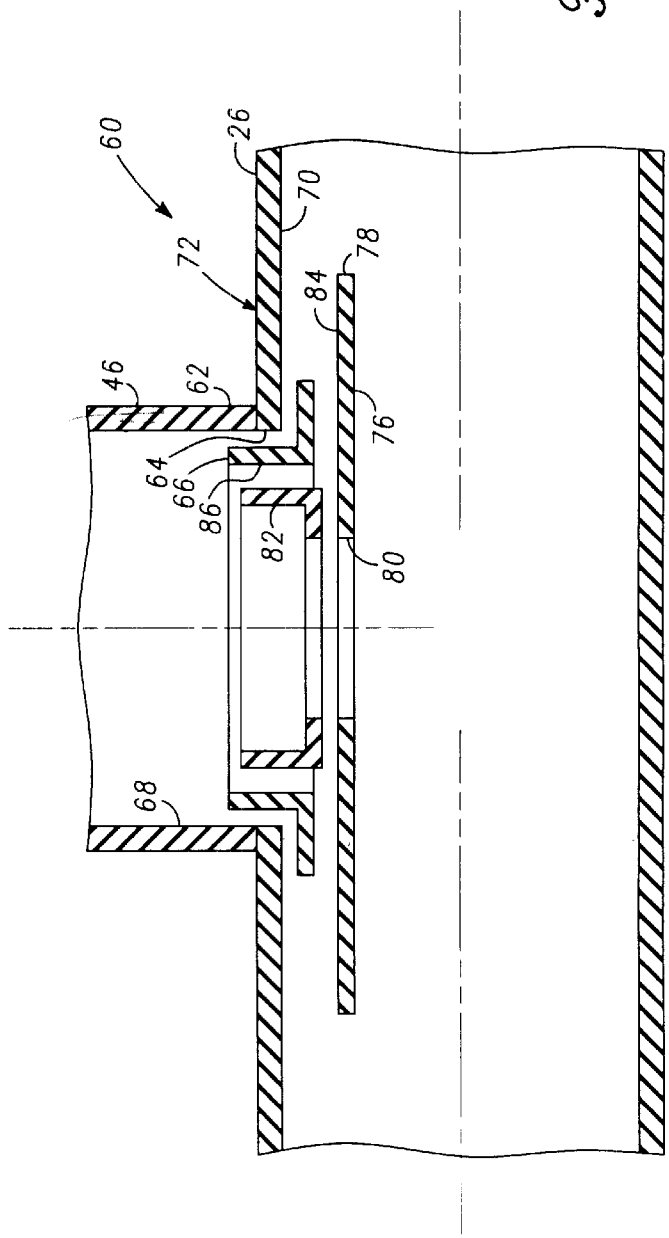

– 1 –
HIGH STRENGTH T-JOINT FOR INFLATABLE TUBE STRUCTURES

BACKGROUND OF THE INVENTION

This invention relates to emergency evacuation equipment for aircraft, in particular, to inflatable aircraft evacuation slides.

The requirement for reliably evacuating airline passengers in the event of an emergency is well known. Emergencies at take-off and landing often demand swift removal of the passengers from the aircraft because of the potential for injuries from fire, explosion, or sinking in water. A conventional method of quickly evacuating a large number of passengers from an aircraft is to provide multiple emergency exits, each of which is equipped with an inflatable evacuation slide. Although evacuation slides permit passengers to quickly and safely descend from the level of the aircraft exit door to the ground, the requirement that each and every aircraft exit door be equipped with an inflatable evacuation slide means that commercial aircraft must devote substantial payload capacity to the carrying of multiple evacuation slides which hopefully will never be used. Accordingly, there has long existed the desire in the industry to make the inflatable evacuation slides as light as possible. One common way of providing an evacuation slide of minimal weight is to design the slide to operate at high pressure. A high pressure inflatable tubular structural member such as those out of which aircraft evacuation slides are constructed, can be made smaller in cross-section, thereby using less weight in fabric, while maintaining the same rigidity as a larger, lower pressure structure. The principal limitation in designers' ability to utilize high inflation pressures, however, is that the T-joints that are necessary to join the tubular structural members into a composite such as an evacuation slide fail at inflation pressures much lower than that which the remainder of the tubular structural member could withstand. Although the problem of T-joint failure is well known and the desire to utilize higher and higher inflation pressures has long existed, there has not heretofore been a solution to the problem of creating a lightweight T-joint capable of withstanding high inflation pressures compatible with conventional assembly methods for such structures.

SUMMARY OF THE INVENTION

The present invention provides a high strength T-joint for inflatable tubular structures in which the opening in the side wall of the first structural member is smaller in cross-section than the second structural member that is joined to it. In one embodiment of the present invention, the T-joint is formed by forming a butt joint between the end of a transverse support member and the side wall of a side rail member of an inflatable evacuation slide. The opening in the side wall of the side rail member is sized to match the end of the transverse support member so that a sealing flange can be applied to the inner surface of the joint to provide an airtight seal. This results in a joint in which the opening is as large as the transverse support member. A reinforcing flange comprising a disk-shaped piece of fabric having a center opening is then bonded to the interior surface of the side rail member over that portion of the sealing flange that is bonded to the side rail member. The opening in the reinforcing flange is substantially smaller than the opening in the side rail member (and, therefore, the cross-sectional area of the transverse support member). Therefore, the reinforcing flange partially blocks the fluid communication between the side rail member and the transverse support member, but substantially reduces the size of the discontinuity in the side wall of side rail member, thereby substantially increasing the circumferential ("hoop") load capacity of the side wall of the side rail member. By reinforcing the side wall of the side rail member, substantial load is taken off the T-joint thereby substantially increasing the rupture pressure of the joint.

BRIEF DESCRIPTION OF THE DRAWING

The present invention will be better understood from a reading of the following detailed description, taken in conjunction with the accompanying drawing figures in which like references designate like elements and, in which:

FIG. 1 is a side view of an evacuation slide incorporating features of the present invention;

FIG. 2 is a bottom view of the evacuation slide of FIG. 1; and

FIG. 3 is a cross-sectional view of a T-joint used to construct the evacuation slide of FIG. 1 incorporating features of the present invention.

DETAILED DESCRIPTION

Figure 4:
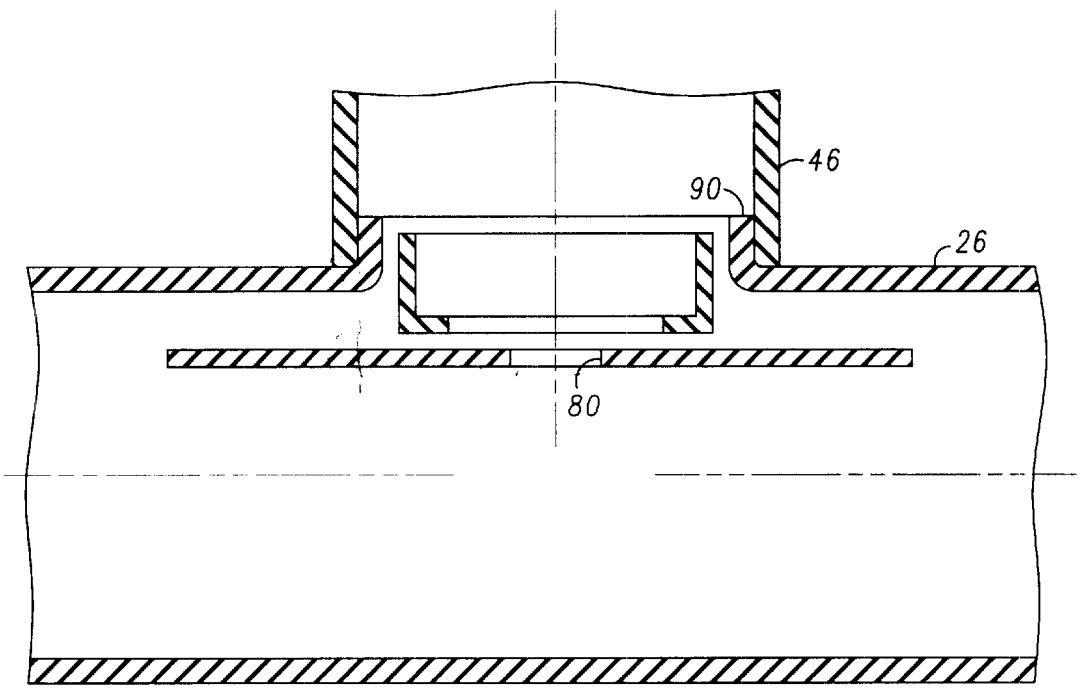
FIG. 4 is a cross-sectional view of a second embodiment of a T-joint used to construct the evacuation slide of FIG. 1 incorporating features of the present invention.

The drawing figures are intended to illustrate the general manner of construction and are not necessarily to scale. In the detailed description and in the figures, specific illustrative examples are shown and herein described in detail. It should be understood, however, that the drawing the figures and detailed description are not intended to limit the invention to the particular form disclosed, but are merely illustrative and intended to teach one of ordinary skill how to make and or use the invention claimed herein and for setting forth the best mode for carrying out the invention.

FIG. 1 shows an inflatable evacuation slide assembly 10 incorporating features of the present invention. Evacuation slide assembly 10 generally comprises a head end 12, and a foot end 14 terminating at toe end 16. Head end 12 is configured to couple evacuation slide assembly 12 to an exit door 18 of an aircraft 20 while foot end 14 is in contact with the ground 22 such that the slide assembly 10 provides a sloping surface to permit the rapid egress of passengers from aircraft 20.

The entire inflatable evacuation slide assembly 10 is preferably fabricated from an air impervious material such as nylon or other lightweight fabric that has been coated with an elastomer such as rubber or urethane. The various parts of the inflatable evacuation slide assembly 10 may be joined together with a suitable adhesive whereby the structure will form a unitary composite structure capable of maintaining its shape during operation. The entire structure of the inflatable evacuation slide assembly 10 is preferably formed such that all of the chambers comprising the structure are interconnected pneumatically, such that a single pressurized gas source, such as compressed carbon dioxide, nitrogen, argon, a pyrotechnic gas generator or combination thereof may be utilized for its deployment.

With reference to FIGS. 1 and 2, the main body of evacuation slide assembly 10 comprises side rail tubes 24, 26 which extend from head end truss assembly 28 to the ground 22. A slide surface 30 comprising a fabric membrane is stretched between side rail tubes 24 and 26 to provide a sliding surface for the disembarking passengers. A right hand rail 32 and a left hand rail (not shown) are positioned atop side rail tubes 24 and 26, respectively, to provide a hand hold for passengers descending evacuation slide assembly 10. Head end truss assembly 28 comprises a plurality of strut tubes 36, 38, upright tubes 40, 42 and a transverse tube 44 adapted to hold head end 12 of evacuation slide assembly 10 against the fuselage of aircraft 20 in an orientation to permit escape slide assembly 10 to unfurl in a controlled manner as it extends toward the ground.

The spaced apart configuration of side rail tubes 24 and 26 is maintained by a head end transverse tube 46, a toe end transverse tube 48 foot, transverse truss 52 and medial transverse truss 54. The bending strength of escape slide assembly 10 is enhanced by means of one or more tension straps 50 stretched from toe end 16 over foot end transverse truss 52, medial transverse truss 54 and attached proximal head end 12 of evacuation slide assembly 10. As described, evacuation slide assembly 10 provides a lightweight structure that consumes a minimum amount of inflation gas while providing the necessary structural rigidity to permit passengers to safely evacuate an aircraft under emergency conditions.

As can be discerned from an examination of FIG. 2, the structural integrity of aircraft evacuation slide 10 is dependent upon numerous T-joints between the various structural members such as the T-joints between medial transverse truss 54 and side rail tubes 24, 26, the T-joints between foot end transverse truss 52 and side rails 24, 26, and the T-joints between head end transverse tube 46 and side rails 24, 26. It is well known from elementary structural mechanics that in a thin-walled pressure vessel, the stress in the circumferential ("hoop") direction is twice the stress in the longitudinal direction. Accordingly, absent discontinuities or other stress concentrations, a thin-walled pressure vessel, such as an inflatable tubular member, will always fail circumferentially. The problem of hoop stress failure is compounded in the case of structures formed of multiple inflatable tubular members such as inflatable evacuation slide assembly 10 because the T-joints necessary to join the various structural members cause a discontinuity in the side wall of the structural member forming the long leg of the T-joint such as side rails 24 and 26. The discontinuity transfers the load that would have been carried by the missing material to the area immediately adjacent the T-joint. The increased load is highest at the widest portion of the T-joint (measured longitudinally with respect to the side rails 24 and 26). Thus, failure mode of the T-joint is generally tearing of the side rails 24 and 26 at the widest point of the T-joint and failure occurs at pressures that are only about 70% or less of the rupture pressure of the remaining side rail.

State-of-the-art T-joints are generally constructed with an opening in side rails 24 and 26 sized to match the tube being joined. This is done in order to simplify construction of the joint and to ensure rapid inflation of all of the members comprising the structure. The inventors of the present invention determined, however, that reducing the size of the opening in the side rails of the structure without reducing the size of the tube being joined to it would not have a deleterious effect on inflation of the structure. Unfortunately, simply attaching a larger transverse tubular member over a small opening (by means of flanges formed at the transverse tube) would put the adhesive bonding the transverse member to the side rail in "T-peel," (i.e. where the two surfaces joined are peeled apart at a 90 degree angle). As is well known, adhesives fail most readily when subjected to T-peel. The resulting joint, therefore, would still be of inferior strength.

FIG. 3 is a cross sectional view of the T-joint between side rail 26 and head end transverse tube 46 as indicated the area circled in FIG. 2. As shown in FIG. 3, the present invention comprises a high strength T-joint in which none of the adhesive joints are placed in T-peel, yet the resulting joint has a smaller discontinuity in the side rail member and consequently higher circumferential load carrying capacity. The high strength T-joint 60 comprises a pressurized tubular member such as side rail 26 joined to a second pressurized flexible tubular member such as head end transverse tube 46. The joint is formed initially by bonding end 62 of head end transverse tube 46 to side rail 26 so that it generally aligns with opening 64 in side rail 26. A sealing flange 66 is then bonded to the inside surface 68 of head end transverse tube 46 as well as the radially inward surface 70 of side rail tube 26 to form an air impervious joint between head end transverse tube 46 and side rail tube 26 (as shown in FIG. 4, a similar joint could be constructed by forming a radially outwardly extending flange 90 in side rail tube 26 which could be inserted into the open end 62 of head end transverse tube 46 and bonded thereto). Use of a sealing flange 66 provides an adhesive joint between head end transverse tube 46 and side rail tube 26 that is loaded substantially in shear rather than in T-peel as would be the case if transverse tube 46 were simply provided with an outwardly or inwardly extending flange bonded to the radially outward surface 72 of side rail tube 26.

The discontinuity engendered by opening 64 is mitigated in accordance with the present invention by the addition of a reinforcing flange 76 which comprises an irregular, quasi-elliptical washer-shaped piece of fabric having an outer diameter 78 that is larger than opening 64 and an aperture 80 extending through reinforcing flange 76 that is smaller than opening 64 in side rail tube 26. Reinforcing flange 76 has an irregular rather than a circular washer-shaped contour because the intersection of side rail tube 26 and head end transverse tube 76 is non-planar, but is the projection of a circle onto the side wall of a cylinder. Accordingly, when laid out flat, the opening 64 in side rail 26 is quasi-elliptical. Reinforcing flange 76 is bonded to the radially inward surface 70 of side rail 26 so that it covers sealing flange 66 and extends into the opening defined by opening 64. That part of reinforcing flange 76 that extends into opening 64, in effect, reduces the apparent size of the discontinuity caused by opening 64 thereby substantially increasing the circumferential load of side rail 26. An additional reinforcing flange 82 may be bonded to the radially outward surface 84 of reinforcing flange 76 as well as inward facing surface 86 of sealing flange 66. Reinforcing flange 82 provides additional thickness to that portion of reinforcing flange 76 extending into opening 64, thereby adding additional strength to compensate for the opening defined by aperture 80 which must exist in order for head end transverse tube 46 to inflate properly.

As noted hereinbefore, in order for evacuation slide assembly 10 to inflate quickly, the T-joints between the various structural members must not be substantially obstructed. Accordingly, the cross sectional area of aperture 80 in reinforcing flange 76 may vary from as much as 90 percent to as little as 10 percent of the cross sectional area of the transverse tubes attached over opening 64, preferably aperture 80 is from 40 to 60 percent as large as the transverse tube and most preferably, aperture 80 is about 40% percent as large as the cross section of the transverse tube attached over opening 64.

Although certain illustrative embodiments and methods have been disclosed herein, it will be apparent from the foregoing disclosure to those skilled in the art that variations and modifications of such embodiments and methods may be made without departing from the spirit and scope of the invention. For example, although head end transverse tube 46 and side rails 24 and 26 are circular in cross section in the illustrative embodiment, tube with other arcuate cross sections such as tubs with elliptical or irregular arcuate cross sections are considered within the scope of the invention. Accordingly, it is intended that the invention shall be limited only to the extent required by the appended claims and the rules and principles of applicable law.

What claimed is:

1. A reinforced T-junction between a first pressurized flexible tubular member having an arcuate wall with an opening therein, said arcuate wall defining a radially inward and a radially outward direction, and a second pressurized flexible tubular member extending generally radially outward from said first pressurized flexible tubular member, said second pressurized flexible tubular member having a first end, a second end, and a side wall defining an inner and an outer surface, said T-junction comprising:

a butt joint between said first end of said second pressurized flexible tubular member and said arcuate wall of said first pressurized flexible tubular member, said butt joint formed by abutting said first end of said second inflatable tubular member against said arcuate wall of said first pressurized flexible tubular member such that said first end of said first pressurized flexible tubular member covers said opening;

a first reinforcing flange, said first reinforcing flange comprising a flexible member having a flange portion and a radially outwardly extending body portion, said flange portion being bonded to said radially inward surface of said arcuate wall of said first pressurized flexible tubular member, and said outwardly extending body portion being bonded to said inner surface of said second pressurized flexible tubular member; and a second reinforcing flange, said second reinforcing flange comprising a flexible sheet having a front surface, a back surface and an aperture extending through from said front surface to said back surface, said second reinforcing flange being bonded to said radially inward surface of said arcuate wall, such that said aperture in said second reinforcing flange is positioned over and partially obstructs said opening in said arcuate wall.

2. The reinforced T-junction of claim 1, wherein:

said opening in said arcuate wall is sized to match the cross sectional area of said second flexible tubular member proximal said first end.

3. The reinforced T-junction of claim 1, further comprising:

a third reinforcing flange, said third reinforcing flange comprising a flexible member having a flange portion bonded to said radially outward surface of said second reinforcing member and a radially outward extending body portion bonded to an inner surface of said first reinforcing flange.

4. The reinforced T-junction of claim 1, wherein:

the aperture in said second reinforcing flange has a cross sectional area that is less than 40% percent of the cross sectional area of the opening in said arcuate wall.

5. The reinforced T-junction of claim 1, wherein:

said first pressurized flexible tubular member comprises a first side rail of an inflatable escape slide assembly adapted to extended from an elevated supporting surface to a lower supporting surface and said second pressurized flexible tubular member comprises a transverse support member attached to said first side rail member for holding said first side rail member in a spaced-apart configuration from a second side rail member.

6. An inflatable escape slide assembly adapted to extended from an elevated supporting surface to a lower supporting surface, said inflatable escape slide assembly comprising:

a flexible panel defining a slide surface having first and second lateral edges and extending from a head end of the inflatable escape slide assembly to a foot end of the inflatable escape slide assembly;

first and second side rail members attached to said first and second lateral edges of said flexible panel, said first and second side rail members each comprising an inflatable tubular member extending from the head end to the foot end of the inflatable escape slide assembly, said first and second side rail members being disposed in a spaced-apart configuration for supporting said flexible panel; and a transverse support member attached to said first side rail member, said transverse support member comprising an inflatable tubular member having first and second ends and a side wall defining an interior cross sectional area proximal said first end, said transverse support member being attached to said first side rail member by means of a T-junction, said T-junction comprising an opening in a side wall of said first side rail member said opening having an inner edge defining a cross sectional area of said opening, said cross sectional area of said opening being less than said interior cross sectional area of said transverse support member, said first end of said transverse support member being sealingly attached to said first side rail member, whereby said side wall of said transverse support member surrounds and is outboard of said inner edge of said opening.

7. The escape slide of claim 6, wherein:

said transverse support member comprises a member holding said first and second side rail members in a spaced-apart configuration.

8. The escape slide of claim 6, wherein:

said transverse support member comprises a transverse truss adapted to support a strap in a spaced apart configuration relative to said first and second side rails.

9. The escape slide of claim 6, wherein:

said T-j unction further comprises a butt joint between said first end of said transverse support member and said side wall of said first side rail member, said butt joint being formed by abutting said first end of said transverse support member to said first side rail member and bonding a first reinforcing layer to an interior surface of said butt joint.

10. The escape slide of claim 9, wherein:

said T-junction further comprises a second reinforcing layer, said second reinforcing layer comprising a washer-shaped layer bonded to said interior surface of said butt joint on top of said first reinforcing layer, said second reinforcing layer having an outer edge and an inner edge, wherein said inner edge defines said cross sectional area of said opening to be less than said interior cross sectional area of said transverse support member.

11. The escape slide of claim 10, wherein:

said T-junction further comprises a third reinforcing layer bonded to said first reinforcing layer, said third reinforcing layer comprising a cup shaped layer of fabric bonded to an interior facing surface of said first reinforcing layer and bonded to a radially outward surface of said second reinforcing layer.

12. A reinforced T-junction between a first pressurized flexible tubular member having an arcuate wall with an opening therein, said arcuate wall defining a radially inward and a radially outward direction, and a second pressurized flexible tubular member extending generally radially outward from said first pressurized flexible tubular member, said second pressurized flexible tubular member having a first end, a second end, and a side wall defining an inner and an outer surface, said T-junction comprising:

a flanged joint between said first end of said second pressurized flexible tubular member and said arcuate wall of said first pressurized flexible tubular member, said flanged joint formed by bonding a flange extending radially outward from said side wall of said first pressurized tubular member to an open first end of said second pressurized flexible tubular member; and a reinforcing flange, said reinforcing flange comprising a flexible sheet having a front surface, a back surface and an aperture extending through from said front surface to said back surface, said reinforcing flange being bonded to said radially inward surface of said arcuate wall, such that said aperture in said reinforcing flange is positioned over and partially obstructs said opening in said arcuate wall.

* * * * *